United States Patent [19]
Bohnhoff

[11] 3,762,227
[45] Oct. 2, 1973

[54] DAMPED AND CUSHIONED STOP

[75] Inventor: Arthur F. Bohnhoff, Saginaw, Mich.

[73] Assignee: General Motors Corporation, Detroit, Mich.

[22] Filed: Oct. 12, 1971

[21] Appl. No.: 188,238

[52] U.S. Cl............................... 74/89.15, 74/424.8
[51] Int. Cl............................................. F16h 27/02
[58] Field of Search...................... 74/89.15, 424.8; 173/162

[56] References Cited
UNITED STATES PATENTS

| | | | |
|---|---|---|---|
| 3,269,199 | 8/1966 | Deehan et al..................... | 74/89.15 |
| 2,572,465 | 10/1951 | Fuehrer et al..................... | 74/424.8 |
| 2,660,028 | 11/1953 | Geyer................................ | 74/424.8 |
| 3,161,074 | 12/1964 | Korthaus et al................... | 74/424.8 |

*Primary Examiner*—Charles J. Myhre
*Assistant Examiner*—Wesley S. Ratliff, Jr.
*Attorney*—W. E. Finken et al.

[57] ABSTRACT

A damped stop for cushioningly arresting relative axial motion between screw and nut portions of a screw and nut type actuator, the stop including an axially collapsible annular housing disposed on the screw portion and adapted for engagement on the nut portion to effect axial collapse and a plurality of elastically deformable annular combination restoring and damping members disposed in the housing. When the nut portion engages the housing and initiates axial collapse thereof the combination members are compressed and radially expanded into engagement on the relatively moving sides of the housing. The compression functions to cushioningly arrest the relative axial motion between the screw and nut portions while the radial expansion generates friction which dissipates kinetic energy and damps the collapse and subsequent expansion of the housing to eliminate transient oscillations.

6 Claims, 6 Drawing Figures

PATENTED OCT 2 1973 3,762,227
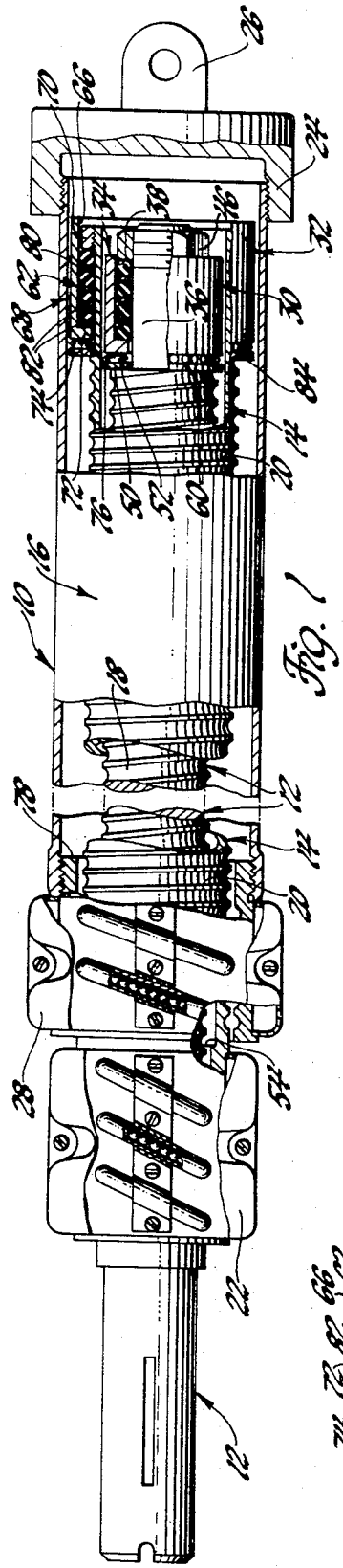
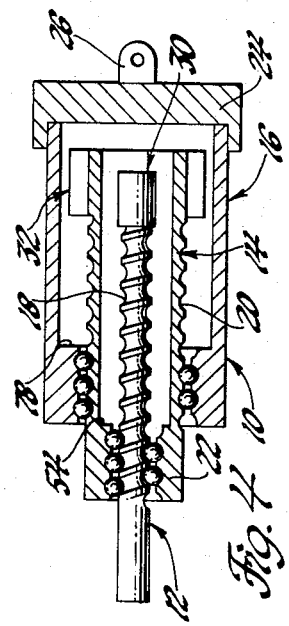
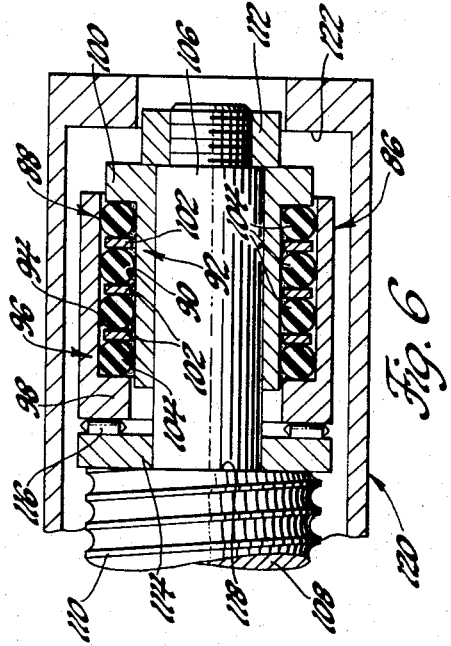
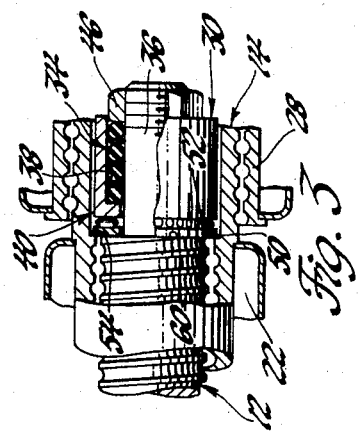
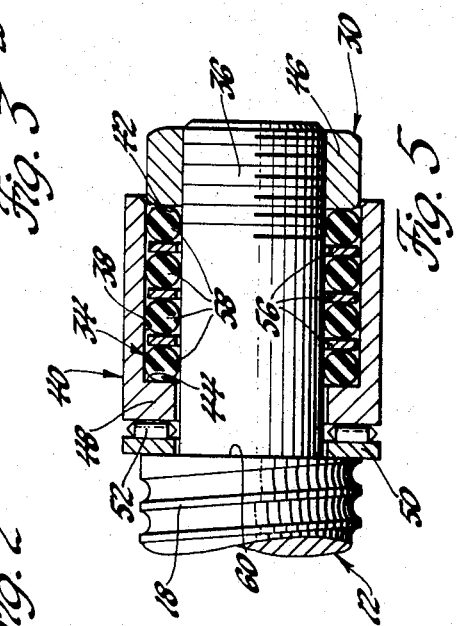
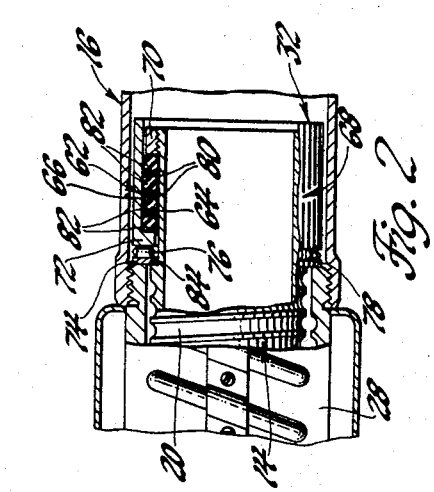
INVENTOR.
Arthur F. Bohnhoff
BY
Saul Schwartz
ATTORNEY

DAMPED AND CUSHIONED STOP

This invention relates generally to a damped stop adapted to cushioningly arrest relative axial movement between a pair of mechanical elements of an assembly and more particularly to a damped stop for cushioningly arresting relative axial movement between screw and nut portions of a screw and nut type actuator assembly.

In screw and nut type actuator assemblies wherein relative rotation between the screw and nut portions thereof effects relative axial movement therebetween, there may be a necessity to positively limit the relative axial movement so as to prevent overtravel. A number of stops designed for this purpose have been proposed and include rigid stops and resilient stops. The rigid type stops while effectively arresting relative axial motion are susceptible to jamming because of the magnitude of the forces generated between the screw and nut portions. The resilient type stops are generally not susceptible to jamming but might well produce undesirable axial transient oscillations between the screw and nut portions since the stop is merely a spring. A stop according to this invention incorporates the desirable characteristics of heretofore known resilient stops and a damping means which functions to virtually eliminate the transient oscillation tendency of such devices.

Accordingly, the primary feature of this invention is that it provides a new and improved damped stop particularly adapted to cushioningly arrest relatively axial bodily movement between screw and nut portions of a screw and nut type actuator assembly. Another feature of this invention is that it provides a new and improved stop which is adapted to cushioningly arrest the relative axial motion and which employs mechanical friction to eliminate transient oscillations. Still another feature of this invention resides in the provision of a stop including an axially collapsible housing having combination friction and restoring elements therein, the housing being disposed in axially stationary relation with respect to one of a pair of axially relatively movable mechanical elements and engageable on the other mechanical element such that axial collapse is effected during which collapse the combination elements are elastically deformed to cushioningly arrest the relative axial motion and simultaneously laterally expanded into frictional engagement on the relatively moving side walls of the housing to effect energy dissipation and damping.

These and other features of this invention will be readily apparent from the following specification and from the drawings wherein:

FIG. 1 is a fragmentary partially broken away elevational view of a screw and nut type actuator assembly incorporating stops according to this invention, the assembly being shown in a fully retracted condition;

FIG. 2 is a partially broken away view of a portion of FIG. 1 but corresponding to a partially extended condition of the actuator assembly;

FIG. 3 is a partially broken away view of another portion of FIG. 1 also corresponding to a partially extended condition of the actuator assembly;

FIG. 4 is a schematic view of the actuator assembly;

FIG. 5 is an enlarged view of a portion of FIG. 1 showing the stop according to this invention; and FIG. 6 is an enlarged view of a modified stop according to this invention.

Referring now to FIGS. 1 and 4 of the drawings, thereshown is a telescopic screw and nut type actuator assembly designated generally 10 adapted for disposition between a stationary element and a movable element and operative to control the position of the movable element through a linear force input. The actuator assembly 10 incoudes a main shaft 12, an inner sleeve 14 disposed telescopically about the main shaft, and an outer sleeve 16 disposed telescopically about the inner sleeve. The main shaft is rotatably supported on the stationary element, not shown, in axially fixed relation to the latter and has formed thereon screw threads 18. The inner sleeve 14 has formed thereon external screw threads 20 and has rigidly attached to the left end thereof an anti-friction ball nut 22 operatively associated with the threads 20 on the main shaft 12. The outer sleeve 16 has rigidly attached to the right end thereof a cap 24 having an attachment lug 26 thereon and rigidly attached to the left end thereof is an anti-friction ball nut 28 operatively associated with the threads 20 on the inner sleeve 14. The attachment lug 26 is adapted for connection to the movable element, now shown, so that when the main shaft 12 is rotated, as by a conventional gear motor or the like, the interaction between the ball nuts 22 and 28 and the threads 18 and 20 effects linear telescopic expansion of the actuator assembly and linear control input to the movable element. The rightward telescopic movement of the inner sleeve relative to the main shaft is limited by a first stop 30 according to this invention supported on the main shaft in axially fixed relation thereto and rightward telescopic movement of the outer sleeve relative to the inner sleeve is limited by a second stop 32 according to this invention supported on the inner sleeve in axially fixed relation thereto.

Referring again to FIG. 4, the actuator assembly 10 is telescopically extendable from a fully retracted condition, FIGS. 1 and 4, to a fully extended condition, not shown, in either a serial mode wherein first one of the inner and outer sleeves traverses its full range of axial movement relative to the other followed by similar full range movement of the other or in a random mode wherein neither of the inner and outer sleeves completes its full range of movement before movement of the other begins. The particular mode in which the actuator assembly extends depends upon a number of factors including the frictional resistance developed between the ball nuts 22 and 28 and the corresponding ones of the threads 18 and 20. For purposes of discussion, however, it will be assumed that extension takes place in a serial mode wherein first the inner sleeve 14 traverses its full range of axial movement relative to the main shaft 12 followed by full range axial movement of the outer sleeve 16 relative to the inner sleeve, it being understood that the operation of the stops 30 and 32 according to this invention is the same regardless of the particular mode of extension.

As seen best in FIGS. 1, 3, 4 and 5, the first stop 30 includes an annular axial collapsible housing 34 having a cylindrical inner wall portion defined by a reduced diameter end portion 36 of the main shaft 12, a cylindrical outer wall portion defined by an internal cylindrical surface 38 of a cylindrical slider member 40 disposed about end portion 36 of the main shaft, and a pair of opposed end walls 42 and 44 defined respectively by a nut 46 on the end portion 36 and an inturned annular flange portion 48 of the slider member 40. The end wall 42 is rigidly attached to the inner wall portion and the end wall 44 is rigidly attached to the outer wall portion so that rightward axial movement of the slider member 40, FIG. 5, effects axial collapse of the housing 34 with relative axial motion occurring between the inner and outer wall portions.

As seen best in FIG. 5, an annular washer 50 is slidably disposed on the end portion 36 of the main shaft inboard of the flange portion 48 of the slider member 40 and extends radially outward beyond the main shaft 12. The washer is separated from the flange portion 48 by a plurality of thrust bearings 52 which function to transmit axial forces between the washer and the slider while dissipating relative rotation therebetween. The portion of the washer 50 projecting radially beyond the main shaft is adapted for engagement on an internal annular shoulder 54, FIG. 1, on the inner sleeve 14 adjacent the edge of ball nut 22. Accordingly, as the left end of inner sleeve approaches the right end of main shaft 12 during relative axial movement, the shoulder 54 engages the washer 50 to effect axial collapse of the housing 34 while any relative rotation between the ball nut and the housing is dissipated by the thrust bearings 52.

Referring now particularly to FIG. 5, a plurality of annular separator washers 56 are slidably or floatingly disposed about the reduced diameter end portion 36 of the main shaft within the housing 34 and function to divide the latter into a plurality of sub-chambers. In each sub-chamber is disposed an annular combination restoring and damping member 58 fabricated from a relatively stiff but elastically deformable material. Each combination member has a circular cross section of diameter predetermined to expand the housing 34 to an initial position, FIGS. 1, 3 and 5, wherein the thrust bearings and the washer 50 are relatively tightly captured under a preload between the inturned flange portion 48 on the slider member and an annular shoulder 60 on the main shaft. In the initial position of the housing the combination members experience slight axial compression to maintain the preload on the washer 50 but are remote from or in only light contact with one or both of the inner and outer wall portions of the housing.

When an axial force is exerted on the washer 50 of sufficient magnitude to initiate axial collapse of the housing 34, each of the sub-chambers is axially collapsed and each of the combination members is axially compressed and consequently undergoes simultaneous elastic axial compression and radial expansion. The axial compression generates on inturned flange portion 48 an axial directed force providing increasing resistance to further axial collapse of the housing. Radial expansion of the combination members effects frictional engagement between each such members and the respective inner and outer wall portions of the housing so that during axial collapse of the latter a frictional force is developed which resists the relative movement between the inner and outer wall portions that occurs during collapse and expansion of the housing. The frictional resistance, of course, increases in porportion to the amount of axial collapse experienced by the housing and functions to dissipate the kinetic energy of the moving nut portion, as described hereinafter, and to damp the collapse and expansion of the housing.

Referring now to FIGS. 1, 2 and 4, the second stop 32 is basically identical to the first stop 30 and includes an axially collapsible housing 62 defined by an external cylindrical surface 64 on the inner sleeve 14, an internal cylindrical surface 66 on a slider member 68, a nut 70 on the inner sleeve 14, and an inturned flange portion 72 on the slider member 68. An annular washer 74 projecting radially beyond the inner sleeve is slidably disposed about the cylindrical surface 64 inboard of the inturned flange portion 72 and is separated therefrom by a plurality of thrust bearings 76 which permit transmission of axial forces between the washer and the housing 62 while dissipating relative rotation therebetween. The washer 74 is adapted for engagement on an internal annular shoulder 78 formed on the outer sleeve 16 generally adjacent the right edge of ball nut 28 so that as the left end of the outer sleeve approaches the right end of the inner sleeve engagement is effected between shoulder 78 and the washer 74 to axially collapse the housing 62, relative rotation between the housing and the outer sleeve being dissipated by the thrust bearings 76.

As in the first stop 30, a plurality of annular spacers 80 are floatingly disposed within the housing 62 and define a plurality of sub-chambers therein, the sub-chambers having disposed therein a plurality of combination restoring and damping members 82 fabricated from the same material as combination members 58. The combination members 82 expand the housing 62 to an initial position, FIGS. 1 and 2, wherein the washer 74 and thrust bearings 76 are captured between the inturned flange portion 72 of the slider 68 and an annular shoulder 84 on the inner sleeve 14. The combination members 82 undergo axial compression and radial expansion during axial collapse of the housing 62 to cushioningly arrest relative axial movement of the outer sleeve while damping the transient oscillations of the housing as described hereinbefore with respect to combination members 58 in the first stop 30.

Describing now a typical operational sequence of the actuator assembly 10, from the fully retracted condition thereof, FIGS. 1 and 4, rotation of the main shaft 12 in the proper direction initiates rightward axial movement of the inner sleeve 14 through the ball nut 22 and threads 18, the outer sleeve 16 moving rightward as a unit with the inner sleeve. As the ball nut 22 approaches the first stop 30 corresponding to the limit of rightward movement of the inner sleeve, engagement is effected between annular shoulder 54 and the washer 50 causing axial collapse of the housing 34. The resistance to axial collapse created by combination members 58 functions to cushioningly arrest relative axial movement between the inner sleeve and the main shaft while radial expansion of the combination members into engagement on the inner and outer wall portions of the housing functions to damp the collapse and subsequent expansion of the housing 34 so as to virtually completely eliminate transient oscillations thereof.

Generally at the instant relative axial movement between the inner sleeve and the main shaft ceases and while rotation of the main shaft continues, rotation of the inner sleeve as a unit with the main shaft relative to the outer sleeve 16 is initiated thereby to effect axial motion of the outer sleeve relative to the inner sleeve through the ball nut 28 and threads 20. As the ball nut 28 approaches the second stop 32 corresponding to the limit of rightward axial movement of the outer sleeve relative to the inner sleeve, engagement is effected between the annular shoulder 78 on the outer sleeve and washer 74. Thereafter, stop 32 cushioningly arrests axial movement of the outer sleeve while the radial expansion of the combination members effects damping to prevent transient oscillations as described hereinbefore with respect to first stop 30. Reversal of the direction of rotation of main shaft 12, of course, effects contraction of the actuator assembly in a similar manner, the relative rotation between the stops 30 and 32 and the corresponding ones of the annular shoulders 78 and 54 being dissipated by the thrust bearings 52 and 76.

Referring now to FIG. 6, thereshown is a modified stop 86 according to this invention including an axially collapsible housing 88 defined by an external cylindrical surface 90 of an inner slider 92, an internal cylindrical surface 94 of an outer slider 96, an inturned flange portion 98 of the outer slider 96, and an outturned flange portion 100 of the inner slider 92. A plurality of annular spacers 102 and a plurality of combination restoring and damping members 104 similar to combination members 58 and 82 are disposed within the housing 88 and function in a manner identical to that described with respect to the first and second stops 30 and 32 upon axial collapse of the housing 88.

The inner slider 92 is rotatably and slidably supported on a reduced diameter end portion 106 of a shaft 108 having threads 110 thereon and is retained on the end portion by a nut 112. A washer 114 is slidably disposed about the end portion 106 inboard of the inturned flange portion 98 of the outer slider and is separated therefrom by a plurality of thrust bearings 116. The combination members 104 expand the housing to an initial position, FIG. 6, wherein the outturned flange 100 is preloaded against nut 112 and the wahser 114 and thrust bearings 116 are captured between an annular shoulder 118 on the shaft 108 and flange portion 98 on slider 96. A sleeve 120 disposed about the shaft 108 and adapted for rotation and axial movement relative thereto, as by a ball nut attached thereto and engaging threads 110, has an annular abutment shoulder 122 at one end thereof and a corresponding abutment shoulder, not shown, at the other end thereof.

The modified stop 86 is adapted to cushioningly and dampingly arrest axial movement of the sleeve 120 relative to the shaft 108 in both directions. More particularly, as the sleeve 120 moves leftward relative to the rotating shaft 108, engagement is effected between outturned flange portion 100 and abutment 122 on the sleeve. Following such engagement the inner slider is forced leftwardly to collapse the housing 88 for dampingly arresting relative axial movement of the sleeve 120 while the thrust bearings 116 dissipate the relative rotation therebetween. With respect to rightward relative axial movement of the sleeve 120, the corresponding abutment on the latter, not shown, engages the washer 114 to effect rightward axial movement of the outer slider 96 thereby to collapse the housing 88 while the thrust bearings 116 again dissipate relative rotation between the sleeve 120 and the housing.

Having thus described the invention, what is claimed is:

1. A damped, self-restoring stop adapted to arrest relative axial movement between a pair of mechanical elements comprising, in combination, means defining a housing disposed axially stationary with respect to one of said pair of mechanical elements and adapted for engagement on the other after a predetermined amount of relative axial movement between said pair of mechanical elements, said housing being axially collapsible by said other mechanical elements from an initial condition and including an axially extending outer wall portion and an axially extending inner wall portion spaced from said outer wall portion and a first laterally extending end wall rigidly connected to siad outer wall portion and a second laterally extending end wall rigidly connected to said inner wall portion and disposed in opposed relationship with respect to said first end wall, said outer wall portion and said first end wall being axially movable relative to said inner wall portion and said second end wall during axial collapse of said housing, and an elastically deformable combination restoring and damping member disposed in said housing between said inner and said outer wall portions and said end walls so that axial collapse of said housing effects simultaneous elastic axial compression and lateral expansion of said combination member whereby the latter resiliently arrests relative axial movement between said pair of mechanical elements while concurrently storing potential energy for expanding said housing to the initial condition thereof and simultaneously frictionally engages said wall portions thereby to dissipate kinetic energy and damp the collapse and expansion of said housing.

2. In a screw and nut type acutator assembly wherein relative rotation between a nut portion and an associated screw portion of said assembly effects relative axial movement between the two portions, a damped self-restoring stop adapted to resiliently arrest relative axial movement between said screw and said nut portions comprising, means defining a housing disposed axially stationary with respect to one of said screw and said nut portions and adapted for engagement on the other after a predetermined amount of relative axial movement between said screw and said nut portions, said housing being axially collapsible by said other of said screw and said nut portions from an initial condition and including spaced axially extending inner and outer wall portions adapted for relative axial movement during collapse of said housing and a pair of laterally extending opposed end walls each rigidly connected to a respective one of said wall portions, anti-friction bearing means between said housing and said other of said screw and said nut portions, and an elastically deformable combination restoring and damping member disposed in said housing between said wall portions and said end walls so that axial collapse of said housing effects simultaneous elastic axial compression and lateral expansion of said combination member whereby the latter resiliently arrests relative axial movement between said screw and said nut portions while concurrently storing potential energy for expanding said housing to the initial condition thereof and simultaneously frictionally engages said wall portions thereby to dissipate kinetic energy and damp the collapse and expansion of said housing.

3. In a screw and nut type actuator assembly wherein relative rotation between a nut portion and an associated screw portion of said assembly effects relative axial movement between the two portions, a damped self-restoring stop adapted to resiliently arrest relative axial movement between said screw and said nut portions comprising, means defining an annular housing disposed axially stationary with respect to one of said screw and said nut portions and adapted for engagement on the other after a predetermined amount of relative axial movement between said screw and said nut portions, said housing being axially collapsible by said other of said screw and said nut portions from an initial condition and including an axially extending cylindrical inner wall portion and an axially extending concentric cylindrical outer wall portion radially spaced from said inner wall portion and axially movable relative to the latter during collapse of said housing and a pair of laterally extending end walls each rigidly connected to a respective one of said inner and said outer wall portions, anti-friction bearing means between said housing and said other of said screw and said nut portions, and an annular elastically deformable combination restoring and damping member disposed in said housing between said wall portions and said end walls so that axial collapse of said housing effects simultaneous elastic axial compression and radial expansion of said combination member whereby the latter resiliently arrests relative axial movement between said screw and said nut portions while concurrently storing potential energy for expanding said housing to the initial condition thereof and simultaneously frictionally engages said inner and said outer wall portions thereby to dissipate kinetic energy and damp the collapse and expansion of said housing.

4. In a screw and nut type actuator assembly wherein relative rotation between a nut portion and an associated screw portion of said assembly effects relative axial movement between the two portions, a damped self-restoring stop adapted to resiliently arrest relative axial movement between said screw and said nut portions comprising, means on said screw portion defining a housing disposed axially stationary with respect to said screw portion and engageable on said nut portion after a predetermined amount of relative axial movement between said screw and said nut portions, said housing being axially collapsible by said nut portion from an initial condition and including an axially extending cylindrical inner wall portion and an axially extending cylindrical outer wall portion radially spaced from said inner wall portion and axially movable relative to the latter during collapse of said housing and a pair of laterally extending end walls each rigidly connected to a respective one of said wall portions, anti-friction bearing means between said housing and said nut portion, an annular spacer floatingly disposed in said housing and dividing the latter into a plurality of sub-chambers axially collapsible concurrently with axial collapse of said housing, and a plurality of annular elastically deformable combination restoring and damping members disposed in respective ones of said sub-chambers so that axial collapse of each of said sub-chambers effects simultaneous elastic axial compression and radial expansion of each of said combination members whereby said combination members resiliently arrest relative axial movement between said screw and said nut portions while concurrently storing potential energy for expanding said housing to the initial condition thereof and simultaneously frictionally engage each of said wall portions thereby to dissipate kinetic energy and damp the collapse and expansion of said housing.

5. In a screw and nut type actuator assembly wherein relative rotation between a nut portion and an associated screw portion of said assembly effects relative axial movement between the two portions, a damped self-restoring stop adapted to resiliently arrest relative axial movement between said screw and said nut portions comprising, means defining a cylindrical surface at one end of said screw portion, a slider member having an internal cylindrical surface and a radially inwardly directed rigid annular flange, said slider member being slidably disposed about said cylindrical surface with said annular flange situated generally adjacent the inboard end of said cylindrical surface and adapted for engagement on said nut portion after a predetermined amount of relative axial movement between said screw and said nut portions, anti-friction bearing means between said slider member and said nut portion, means on said screw portion defining a fixed abutment adjacent the outboard end of said cylindrical surface cooperating with the latter and with said internal cylindrical surface and said flange in defining an annular housing axially collapsible by said nut portion from an initial condition, a plurality of annular spacers floatingly disposed in said housing and dividing the latter into a plurality of sub-chambers axially collapsible concurrently with axial collapse of said housing, and a plurality of annular elastically deformable combination restoring and damping members disposed in respective ones of said sub-chambers so that axial collapse of each of said sub-chambers effects simultaneous elastic axial compression and radial expansion of each of said combination members whereby said combination members resiliently arrest relative axial movement between said screw and said nut portions while concurrently storing potential energy for expanding said housing to the initial condition thereof and simultaneously frictionally engaging each of said internal surface on said slider and said cylindrical surface on said screw portion thereby to dissipate kinetic energy and damp the collapse and expansion of said housing.

6. In a screw and nut type actuator assembly wherein relative rotation between a nut portion and an associated screw portion of said assembly effects reative axial movement between the two portions, a double acting damped self-restoring stop adapted to resiliently arrest relative axial movement of said nut portion in either of two opposite directions comprising, means defining a cylindrical surface on said screw portion, an inner slider member slidably disposed on said cylindrical surface and including an external cylindrical surface defining an inner wall portion and an outturned annular flange disposed adjacent one end of said cylindrical surface defining a first end wall, means on said screw portion adapted to retain said inner slider member thereon, an outer slider member telescopically disposed about said inner slider member and including an internal cylindrical surface defining an outer wall portion and an inturned annular flange disposed adjacent the other end of said cylindrical surface on said screw portion defining a second end wall, means on said screw portion adapted to retain said outer slider member thereon, said inner and said outer wall portions and said first and said second end walls cooperating in defining an axially collapsible housing on said screw portion situated in axially stationary relation to the latter, means associated with said nut portion adapted for alternate engagement on said inner and said outer slider members after a predetermined amount of axial movement of said nut portion relative to said screw portion in corresponding ones of said two opposite directions thereby to effect axial collapse of said housing from an initial condition, anti-friction bearing means associated with said housing and adapted to prevent unitary rotation of said housing with said nut portion during axial collapse of said housing, a plurality of annular spacers floatingly disposed in said housing and dividing the latter into a plurality of sub-chambers axially collapsible concurrently with axial collapse of said housing, and a plurality of annular elastically deformable combination restoring and damping members disposed in respective ones of said sub-chambers so that axial collapse of each of said sub-chambers effects simultaneous elastic axial compression and radial expansion of each of said combination members whereby said combination members resiliently arrest relative axial movement between said screw and said nut portions while concurrently storing potential energy for expanding said housing to the initial condition thereof and simultaneously frictionally engage each of said inner and said outer wall portions of said housing thereby to dissipate kinetic energy and damp the collapse and expansion of said housing.

* * * * *